(12) United States Patent
Ramanathan et al.

(10) Patent No.: US 12,094,133 B2
(45) Date of Patent: Sep. 17, 2024

(54) AUGMENTING TRAINING SAMPLES FOR MOTION DETECTION SYSTEMS USING IMAGE ADDITIVE OPERATIONS

(71) Applicant: ObjectVideo Labs, LLC, Tysons, VA (US)

(72) Inventors: Narayanan Ramanathan, Chantilly, VA (US); Gang Qian, McLean, VA (US); Sima Taheri, McLean, VA (US); Sung Chun Lee, Fairfax, VA (US); Sravanti Bondugula, Vienna, VA (US); Allison Beach, Leesburg, VA (US)

(73) Assignee: ObjectVideo Labs, LLC, Tysons, VA (US)

( * ) Notice: Subject to any disclaimer, the term of this patent is extended or adjusted under 35 U.S.C. 154(b) by 430 days.

(21) Appl. No.: 17/585,060

(22) Filed: Jan. 26, 2022

(65) Prior Publication Data
US 2022/0254037 A1   Aug. 11, 2022

Related U.S. Application Data

(60) Provisional application No. 63/147,870, filed on Feb. 10, 2021.

(51) Int. Cl.
*G06K 9/00* (2022.01)
*A61K 35/12* (2015.01)
*G06T 7/254* (2017.01)

(52) U.S. Cl.
CPC .... *G06T 7/254* (2017.01); *G06T 2207/20081* (2013.01); *G06T 2207/20216* (2013.01); *G06T 2207/20224* (2013.01)

(58) Field of Classification Search
CPC ............. G06K 9/00; A61K 35/12; G06T 7/20
USPC ........ 382/100, 103, 106–107, 115–116, 123, 382/154–155, 162, 173, 181, 190, 199, 382/216, 224, 232, 254, 276, 286–291, 382/305, 321; 348/154, 135, 161
See application file for complete search history.

(56) References Cited

U.S. PATENT DOCUMENTS

| 11,070,833 B2* | 7/2021 | Toresson ............... H04N 19/176 |
| 11,710,298 B2* | 7/2023 | Ramanathan ............. G06T 7/70 |
| 2008/0187219 A1* | 8/2008 | Chen ...................... G06V 20/40 |
| | | 382/173 |
| 2019/0114486 A1* | 4/2019 | Wang .................... H04N 21/488 |
| 2019/0244366 A1* | 8/2019 | Yu .......................... G06N 3/045 |
| 2020/0084353 A1* | 3/2020 | Wacey ................. H04N 13/239 |
| 2021/0152739 A1* | 5/2021 | Lu .......................... H04N 5/783 |
| 2022/0027664 A1* | 1/2022 | Amin .................. G06F 18/2431 |

* cited by examiner

*Primary Examiner* — Seyed H Azarian
(74) *Attorney, Agent, or Firm* — Fish & Richardson P.C.

(57) ABSTRACT

Methods, systems, and apparatus, including computer programs encoded on a computer storage medium, for training an event detector. The methods, systems, and apparatus include actions of identifying a portion of a first interframe difference image that represents motion of an OI, determining that a second interframe difference image represents motion by a non-OI, combining the portion of the first interframe difference image and the second interframe difference image as a third interframe difference image labeled as motion of both an OI and a non-OI, and training an event detector with the third interframe difference image.

20 Claims, 2 Drawing Sheets

AUGMENTING TRAINING SAMPLES FOR MOTION DETECTION SYSTEMS USING IMAGE ADDITIVE OPERATIONS

CROSS-REFERENCE TO RELATED APPLICATIONS

This application claims the benefit of U.S. Provisional Application No. 63/147,870, filed Feb. 10, 2021, which is incorporated by reference in its entirety.

TECHNICAL FIELD

This disclosure application relates generally to monitoring systems, and more particularly, to detecting events.

SUMMARY

Techniques are described for training an event detector. Training a deep learning system to detect instances when object(s) of interest (OI) moved within a camera's field of view may include providing the system with training samples that capture how the OIs typically move. Motion detection systems may primarily look for "change" from one frame to another and hence, interframe difference images may be provided as training samples to the deep learning system.

Interframe difference images may represent differences between corresponding pixels between two frames. For example, interframe difference images may be obtained by taking two image frames (that differ in time-stamp: adjacent frames or frames staggered in time) from a camera's video feed, subtracting one from the other and applying the absolute operator on the pixel differences. Accordingly, the interframe difference image may capture size, scale and orientation of the moving object(s) and may be computationally simple.

A motion detection system may be designed as a binary classification system or an N-class classification system. In a binary system, the instances when one or more objects of interest such as person, animal, vehicle moved may be detected as "motion" and instances when nothing changed in the scene and when inanimate scene entities such as trees, plants, flags, sprinkler systems, and debris exhibited change may be detected as "no motion." Interframe difference images may need to be assimilated for both the classes: image frames of motion signatures (person, animal, car, respectively) as the motion-class and image frames capturing motion signatures of trees waving, flags fluttering, debris moving in random fashion, and those where nothing perceivably moved as the no-motion-class. Differences in pixels between two frames for a moving person may be considered a motion signature for a person, differences in pixels between two frames for a moving tree may be considered a motion signature for a tree, etc. A similar such extension may apply if the motion detection system is to be designed as an N-class classification system: for instance "person-motion class", "vehicle-motion class" and "no-motion class", a 3-class example.

However, making a training set comprehensive may be challenging. In other words, the images used as training samples may ideally capture instances when the object(s) moved at different distances from the camera (accounting for scale variations), in different directions (accounting for varying scene orientations), at different times of the day (capturing motion signatures under different illumination conditions), under different imaging modes of the camera (for instance, infrared and red-green-blue), at different speeds (person-walking, person-sprinting, car slowly pulling out of a driveway, car racing through the street), and in conjunction with other OI motion and/or non-OI motion The number of training samples available for scenes with no perceivable motion, scenes with inanimate entities exhibiting change, and scenes with single OI motion may largely out-number the samples available for multi-object motion, for single-object motion in conjunction with non-OI motion, and single OI motion under inclement weather conditions. Some scenarios where multiple events are happening simultaneously for which training samples are typically far and few may include, for example, person motion when tree branches were shaking notably, car motion when flag was fluttering, person motion under rainy conditions, person walking out the door when a car was driving through the street, two or more persons walking into the property simultaneously, and person walking in the presence of changing holiday lights. Persons, vehicles, and animals may be considered OI and other objects may be considered non-OI.

Accordingly, a system may combine interframe difference images that show motion of single objects together to augment the training samples. For example, the system may combine a first interframe difference image of a person moving with a second interframe difference image of a tree moving to generate a new interframe difference image that represents both a person moving and a tree moving, and then train an event detector with training samples that include the new interframe difference image. The event detector may then be able to detect that a video is showing both motion of a person and motion of a tree.

Implementations of the described techniques may include hardware, a method or process implemented at least partially in hardware, or a computer-readable storage medium encoded with executable instructions that, when executed by a processor, perform operations.

The details of one or more implementations are set forth in the accompanying drawings and the description below. Other features will be apparent from the description and drawings, and from the claims.

DESCRIPTION OF DRAWINGS

Like reference numbers and designations in the various drawings indicate like elements

DETAILED DESCRIPTION

Techniques are described for training an event detector.

Figure 1:
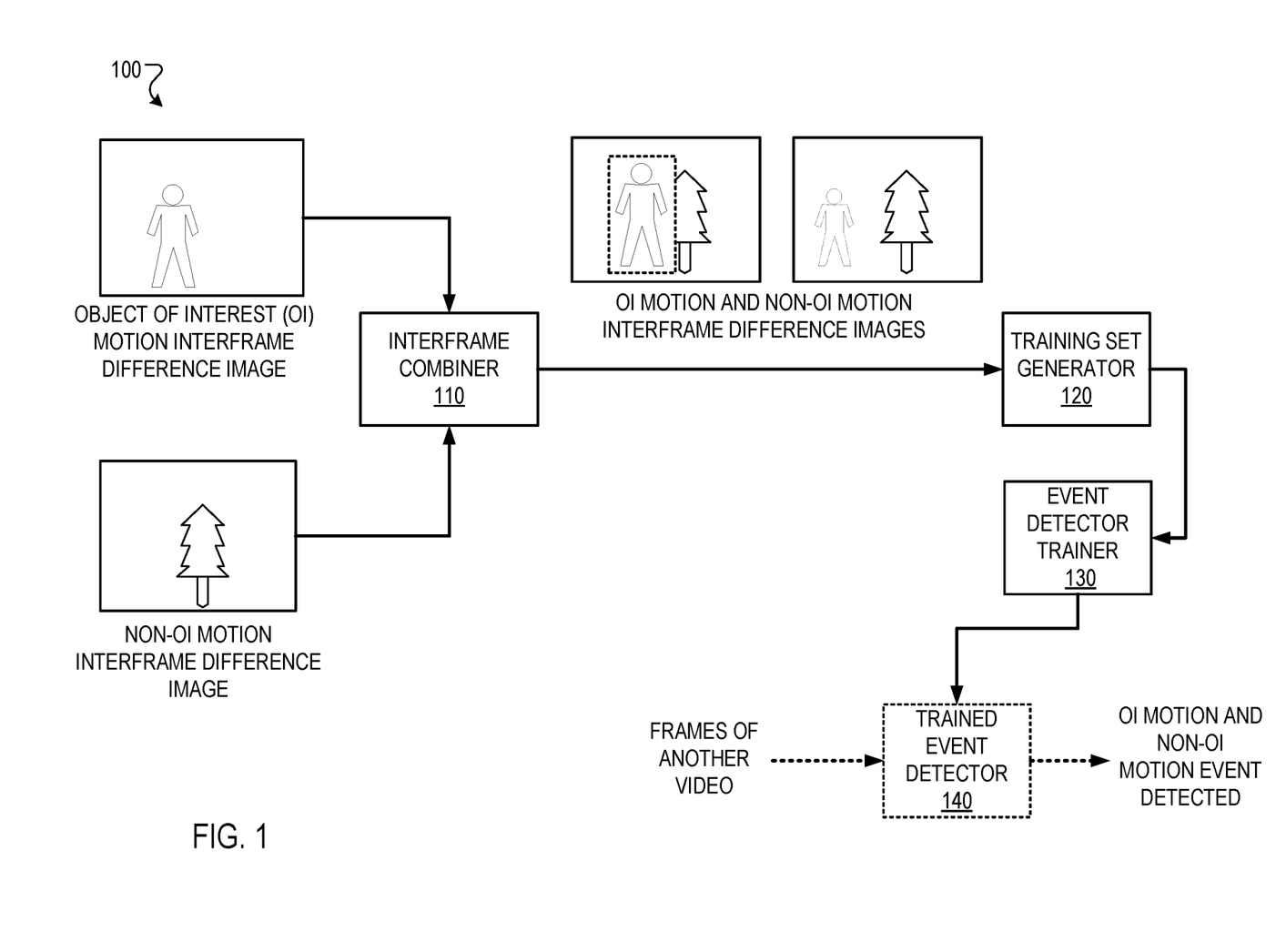
FIG. 1 illustrates an example block diagram of a system for training an event detector.

FIG. 1 illustrates an example block diagram of a system 100 for training an event detector. The system 100 includes an interframe combiner 110 that combines interframe difference images, a training set generator 120 that generates a training set, and an event detector trainer 130 that trains an event detector 140 with the training set.

The interframe combiner 110 combines interframe difference images into new interframe difference images. For example, the interframe combiner 110 may receive a first interframe difference image that shows motion of an OI and second interframe that shows motion of a non-OI, and generate a third interframe difference image that shows both motion of an OI and a non-OI. In another example, the interframe combiner 110 may receive a first interframe difference image that shows motion of an OI and second interframe that shows motion of a second OI, and generate a third interframe difference image that shows motion of two OIs.

The interframe combiner 110 may combine interframe difference images in a variety of different approaches. In a first approach, the interframe combiner 110 may average two interframe difference images together to generate a new interframe difference image. For example, the interframe combiner 110 may, for a pixel location of (20, 20), average a pixel value of 50 in a first interframe difference image and 60 in a second interframe difference image and determine a value of 55 for the pixel location of (20, 20) in the new interframe difference image, and repeat for each pixel location in the images.

In some implementations, the interframe combiner 110 may use a weighted average. For example, the interframe combiner 110 may, for a pixel location of (20, 20), average a pixel value of 50 in a first interframe difference image and 60 in a second interframe difference image by using a weight of 80% for the first and 20% for the second and determine a value of 52 for the pixel location of (20, 20) in the new interframe difference image, and repeat for each pixel location in the images using the same weights. The weights for the two images may add up to 100%.

In some implementations, the interframe combiner 110 may randomly generate the weights used for a pair of images five, ten, twenty, or some other amount of times to represent scenarios where lighting or illumination are different. More weight may correspond to more lighting which results in higher differences between frames. For example, the interframe combiner 110 may generate ten new interframe difference images for each pair of received interframe difference images based on randomly determining weights ten times.

In a second approach, the interframe combiner 110 may combine different portions of two interframe difference images together to generate a new interframe difference image. For example, the interframe combiner 110 may replace a lower left side of a first interframe difference image that represents non-OI motion with a lower left side of a second interframe difference image that represents OI motion, and keep the other portions of the first interframe difference image.

In some implementations, the interframe combiner 110 may determine a bounding box around the OI in a first interframe difference image, and overwrite pixels in the second interframe difference image with the bounding box. The bounding box may be a smallest shape, e.g., a rectangle, oval, or some other shape, that includes all portions of the OI shown in the image. For example, the interframe combiner 110 may determine that the four coordinates that bound a rectangular bounding box in the first interframe difference image are [x1,y1,x2,y2], and then replace the values of pixels of the second image bounded by those coordinates with the values of corresponding pixels in the bounding box in the first interframe difference image.

In some implementations, the interframe combiner 110 may determine the bounding box based on metadata of the interframe difference image that indicates where a moving object is in a non-interframe difference image from which the interframe difference image was generated. For example, an object-motion detector may analyze a first non-interframe difference image, detect a moving human within a rectangle with the coordinates [x1,y1,x2,y2] and, in response, determine a bounding box with those coordinates is the smallest rectangle that includes the entirety of the human, and label an interframe difference image generated from the first non-interframe difference image with the coordinates based on storing the coordinates in association with the interframe difference image.

In a third approach, the interframe combiner 110 may combine the first and second approaches and average only portions of two interframe difference images. For example, the interframe combiner 110 may determine that the four coordinates that bound the bounding box in the first image are [x1,y1,x2,y2], and then average the values of pixels in the first interframe difference image in that bounding box with values of pixels in those four coordinates in the second interframe difference image and keep the values of the remaining pixels in the second interframe difference image.

In a fourth approach, the interframe combiner 110 may combine the first and second first interframe difference images with a location translation. For example, the interframe combiner 110 may determine that the four coordinates that bound the bounding box in the first interframe difference image are [x1,y1,x2,y2], and then replace the values of pixels of the second first interframe difference image bounded by the coordinates [x1+a,y1+b,x2+a,y2+b] with the values of corresponding pixels in the bounding box, where a and b is randomly determined. The interframe combiner 110 may generate multiple interframe difference images from the same two interframe difference images by randomly determining different location translations. With this approach, the interframe combiner 110 may generate new interframe difference images that should correspond to motion by OI in different locations while there is motion by the non-OI in a constant location.

In a fifth approach, the interframe combiner 110 may combine the first and second first interframe difference images with scaling. For example, the interframe combiner 110 may determine that the four coordinates that bound the bounding box in the first interframe difference image are [x1,y1,x2,y2], scale the bounding box by a factor of two which doubles each dimension, and then replace the values of pixels of the second first interframe difference image bounded by the coordinates [x1,y1,x2*2,y2*2] with the values of corresponding pixels in the bounding box. The interframe combiner 110 may generate multiple interframe difference images from the same two interframe difference images by randomly determining an amount to scale the bounding box. With this approach, the interframe combiner 110 may generate new interframe difference images that should correspond to motion by OI at different distances from a camera while there is motion by the non-OI in a constant location and constant distance.

In a sixth approach, the interframe combiner 110 may combine the fourth and fifth approaches and combine the first and second first interframe difference images with a location translation and scaling. For example, the interframe combiner 110 may determine that the four coordinates that bound the bounding box in the first interframe difference image are [x1,y1,x2,y2], scale the bounding box by a factor of two which doubles each dimension, and then replace the values of pixels of the second first interframe difference image bounded by the coordinates [x1+a,y1+b,x2*2+a, y2*2+b] with the values of corresponding pixels in the bounding box, where a and b is randomly determined. With this approach, the interframe combiner 110 may generate new interframe difference images that should correspond to motion by OI at different distances from a camera and different locations while there is motion by the non-OI in a constant location and constant distance.

The training set generator 120 may generate a training set based on the interframe difference images generated by the interframe combiner 110. For example, the training set generator 120 may receive thirty interframe difference images generated by the interframe combiner 110, where the images are generated from a first interframe difference image showing OI motion and a second interframe difference image showing non-OI motion and the interframe difference images are generated based on all of the six approaches described above.

In the example, the training set generator 120 may label each of the thirty interframe difference images as showing both OI motion and non-OI motion. While generating a training set with interframe difference images for all approaches, the training set generator 120 may similarly only use interframe difference images generated with one, two, or a different number of the approaches from above. A determination of which approaches to use is described in more detail below in connection with FIG. 2.

In some implementations, the training set generator 120 may have the interframe combiner 110 combine interframe difference images based on determining deficiencies in a training set. For example, the training set generator 120 may determine that less than 5% of the training set shows motion by OI and non-OI motion in the same interframe difference image and, in response, the training set generator 120 may instruct the interframer combiner 110 to create additional interframe difference images to include in the training set by combining an interframe difference image that shows OI motion and an interframe difference image that shows non-OI motion.

In some implementations, the training set generator 120 may determine deficiencies in types of OI motion or types of non-OI motion, and augment the training set. For example, the training set generator 120 may determine there are no interframe difference images that show both motion of a person (OI motion) and motion of a flag (non-OI motion), in response, identify an interframe difference image that shows motion of a person and another interframe difference image that shows motion of a flag, and instruct the interframe combiner 110 to combine the inteframe difference images into new interframe difference images that are included in the training set.

In some implementations, the training set generator 120 may generate new interframe difference images based on the sequence of events being observed by the system over a timeseries. For example, the training set generator 120 may determine that if the OI is visible throughout, no occlusion with a non-OI occurs. However, if the generator 120 determines that the OI disappears with no explanation, the training set generator 120 may determine that the OI disappeared behind a stationary occluding object, such as a pillar, or column. If the generator 120 determines that the OI overlaps a non-OI and partially disappears, the generator 120 determines that the non-OI (flag or tree) is occluding the OI. Depth wise, the tree is in front of the person. Conversely, if the generator 120 determines that the OI overlaps a non-OI, but remains distinguishable while the non-OI partially disappears, the generator 120 determines that the OI is occluding the non-OI. Depth wise the person is in front of the tree.

The event detector trainer 130 may obtain the training set generated by the training set generator 120 and train an event detector 140 to detect motion by an OI even when there is motion by other objects. For example, the event detector trainer 130 may train the event detector 140 to detect that a video is showing simultaneous motion by both an OI and a non-OI. In another example, the event detector trainer 130 may train the event detector 140 to detect that a video is showing simultaneous motion by both an OI and a second OI.

The event detector trainer 130 may train a neural network using the interframe differences in the training set as the input to the neural network and the label as the desired output of the neural network for that particular input. The neural network that is trained may be a deep network that includes fewer parameters than an object detector. The trained event detector 140 may then receive interframe differences generated from another video and detect whether the other video shows motion by both an object of interest and some other object.

Figure 2:
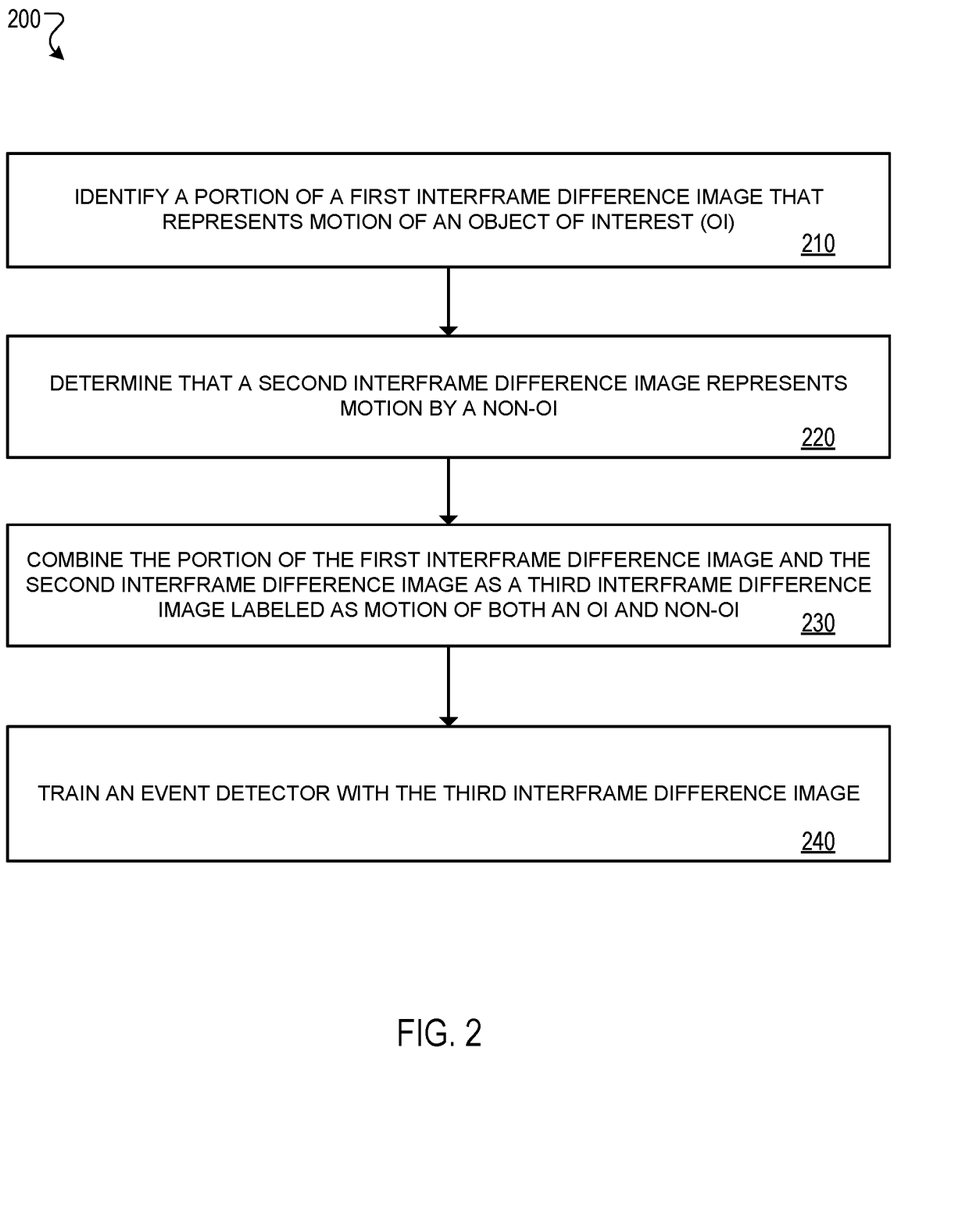
FIG. 2 is a flow diagram of an example process for training an event detector.

FIG. 2 is a flow diagram of an example process 200 for training an event detector. Process 200 can be implemented using the system 100 described above. Thus, descriptions of process 200 may reference one or more of the above-mentioned components, modules, or computational devices of system 100. In some implementations, described actions of process 200 are enabled by computing logic or software instructions executable by a processor and memory of an example electronic device.

Briefly, and as will be described in more detail below, the process 200 includes identifying a portion of a first interframe difference image that represents motion of an OI (210), determining that a second interframe difference image represents motion by a non-OI (220), combining the portion of the first interframe difference image and the second interframe difference image as a third interframe difference image labeled as motion of both an OI and a non-OI (230), and training an event detector with the third interframe difference image (240).

The process 200 includes identifying a portion of a first interframe difference image that represents motion of an OI (210). For example, the interframe combiner 110 may determine that a first interframe difference image is labeled with four coordinates that define a rectangular bounding box and labeled as showing OI motion and, in response, identify the portion of the first interframe difference image within those four coordinates as representing motion of an OI and the rest of the first interframe difference image as not representing motion of an OI. In another example, the interframe combiner 110 may determine that a second interframe difference image is labeled with four coordinates that define a bounding box and labeled as showing non-OI motion and, in response, identify none of the second interframe difference image as showing motion of an OI. In yet another example, the interframe combiner 110 may determine that a first interframe difference image is not labeled with four coordinates that define a bounding box and is labeled as showing OI motion and, in response, be unable to identify which portions of the first interframe difference image represent motion of an OI.

As described above, the interframe combiner 110 may determine that an interframe difference image is labeled with coordinates for a bounding box and an indication whether the interframe image shows motion by an OI. The labels may be generated by an object/motion detector that automatically both detects motion and visually recognizes different objects or by a human that looks at the non-interframe images and draws bounding boxes around moving objects and labels whether the bounding box corresponds to an OI or non-OI.

In some implementations, identifying a portion of a first interframe difference image that represents motion of an OI includes obtaining a first image and a second image, determining a bounding box around the OI from the second image, and determining the first interframe difference image based on a difference between values of pixels in the first image and the second image, where the portion of the first interframe difference image that represents motion of the OI corresponds to a location of the bounding box around the OI that was determined. For example, an object motion detector may receive a first image of a person and second image of a person captured a second later, determine from the first image that the second image shows a person that is moving, draw a bounding box that is the smallest box around the person as shown in the second image, and determine the first interframe difference image from a difference between each corresponding pixel between the first image and the second image.

The process 200 includes determining that a second interframe difference image represents motion by a non-OI (220). For example, the interframe combiner 110 may determine that a second interframe difference image is labeled with "Non-OI motion" which indicates that it shows motion that's not from an OI. In another example, the interframe combiner 110 may determine that a second interframe difference image is labeled with "Tree motion" which indicates that it shows motion of a tree, and the interframe combiner 110 may determine that the second interframe difference image represents motion by a non-OI as a tree is a non-OI.

The process 200 includes combining the portion of the first interframe difference image and the second interframe difference image as a third interframe difference image labeled as showing motion of both an OI and a non-OI (230). For example, the interframe combiner 110 may combine two interframe difference images based on any of the six approaches described above.

In some implementations, combining the portion of the first interframe difference image and the second interframe difference image as a third interframe difference image labeled as motion of both an OI and a non-OI includes determining an average value of each pixel location in the first interframe difference image and the second interframe difference image and generating the third interframe difference image to include pixel locations with values that are the average values of the pixel locations in the first interframe difference image and the second interframe difference image. For example, the interframe combiner 110 may use the first approach to generate a new interframe difference image from the first and second interframe difference images.

In some implementations, combining the portion of the first interframe difference image and the second interframe difference image as a third interframe difference image labeled as motion of both an OI and a non-OI includes determining a weighted average value of each pixel location in the first interframe difference image and the second interframe difference image and generating the third interframe difference image to include pixel locations with values that are the weighted average values of the pixel locations in the first interframe difference image and the second interframe difference image. For example, the interframe combiner 110 may use the first approach to generate a new interframe difference image from the first and second interframe difference images, and also weight values in the first and second difference images differently.

In some implementations, combining the portion of the first interframe difference image and the second interframe difference image as a third interframe difference image labeled as motion of both an OI and a non-OI includes generating the third interframe difference image to include a first set of pixel locations with values that are from the portion of the first interframe difference image that represents motion of the OI and a second set of pixel locations with values that are from the second interframe difference image. For example, the interframe combiner 110 may use the second approach to generate a new interframe difference image from the first and second interframe difference images.

In some implementations, combining the portion of the first interframe difference image and the second interframe difference image as a third interframe difference image labeled as motion of both an OI and a non-OI includes determining, for each pixel location within the portion of the first interframe difference image that represents motion of the OI, an average value of the pixel location in the first interframe difference image and the second interframe difference image and generating the third interframe difference image to include pixel locations within a bounding box with values that are the average values of the pixel locations in the first interframe difference image and the second interframe difference image, and pixel locations outside the bounding box with values that are from the second interframe difference image. For example, the interframe combiner 110 may use the third approach to generate a new interframe difference image from the first and second interframe difference images.

In some implementations, combining the portion of the first interframe difference image and the second interframe difference image as a third interframe difference image labeled as motion of both an OI and a non-OI includes generating the third interframe difference image to include a first set of pixel locations with values, that are from pixel locations within the portion of the first interframe difference image that represents motion of the OI, at pixel locations translated from the pixel locations within the portion of the first interframe difference image and a second set of pixel locations with values that are from the second interframe difference image. For example, the interframe combiner 110 may use the fourth approach to generate a new interframe difference image from the first and second interframe difference images.

In some implementations, combining the portion of the first interframe difference image and the second interframe difference image as a third interframe difference image labeled as motion of both an OI and a non-OI includes generating the third interframe difference image to include a first set of pixel locations with values that are from pixel locations within the portion of the first interframe difference image that represents motion of the OI scaled by a factor and a second set of pixel locations with values that are from the second interframe difference image. For example, the interframe combiner 110 may use the fifth approach to generate a new interframe difference image from the first and second interframe difference images.

In some implementations, combining the portion of the first interframe difference image and the second interframe difference image as a third interframe difference image labeled as motion of both an OI and a non-OI includes generating the third interframe difference image to include a first set of pixel locations with values, that are from pixel locations within the portion of the first interframe difference image that represents motion of the OI scaled by a factor, at pixel locations translated from the pixel locations within the bounding box and a second set of pixel locations with values that are from the second interframe difference image. For example, the interframe combiner 110 may use the sixth approach to generate a new interframe difference image from the first and second interframe difference images.

In some implementations, the interframe combiner 110 may combine interframe difference images based on whether bounding boxes that represent motion of objects within the interframe difference images overlap. For example, the interframe combiner 110 may determine whether bounding boxes that represent motion of OIs and non-OIs within the interframe difference images overlap and select which of the six different approaches to use based on that determination.

In some implementations, the process 200 includes determining that a bounding box for the OI and a bounding box for the non-OI overlap and based on determining that the bounding box for the OI and the bounding box for the non-OI overlap, generating the third interframe difference image to include the first set of pixel locations with the values that are from the portion of the first interframe difference image that represents motion of the OI and the second set of pixel locations with values that are from the second interframe difference image. For example, the interframe combiner 110 may determine that a bounding box for a non-OI and a bounding box for a OI at least partially overlap and, in response, determine to use the second approach and generate a new interframe difference image that uses values from the interframe difference image that shows OI motion as the values where the bounding box of the OI motion is located in the new interframe difference image and uses values from the interframe difference image that shows non-OI motion for the remainder of the new interframe difference image.

In some implementations, the process 200 includes determining that a bounding box for the OI and a bounding box for the non-OI do not overlap and based on determining that the bounding box for the OI and the bounding box for the non-OI do not overlap, generating the third interframe difference image to include the pixel locations with the values that are the respective average value of the respective pixel location in the first interframe difference image and the second interframe difference image. For example, the interframe combiner 110 may determine that a bounding box for a non-OI and a bounding box for an OI do not overlap at all and, in response, determine to use the first approach or third approach and generate a new interframe difference image that averages all the values of pixels between the interframe difference images.

In yet another example, the interframe combiner 110 may determine that a bounding box for a non-OI and a bounding box for a OI at least partially overlap and, in response, determine to use the third approach and generate a new interframe difference image that averages values in the bounding box in the two interframe difference images and uses values from the interframe difference image that shows non-OI motion for the remainder.

In some implementations, the process 200 includes translating the pixel locations within the portion of the first interframe difference image that represents motion of the OI to the first set of pixel locations and determining that the first set of pixel locations and a bounding box around the non-OI do not overlap. For example, the interframe combiner 110 may translate a location and/or scale a bounding box of one or both of the interframe difference images, and then determine whether the bounding boxes overlap to determine the approach for combining as described above.

The process 200 includes training an event detector with the third interframe difference image (240). For example, the event detector trainer 130 may train the event detector 140 with interframe difference images generated by the interframe combiner 110.

The described systems, methods, and techniques may be implemented in digital electronic circuitry, computer hardware, firmware, software, or in combinations of these elements. Apparatus implementing these techniques may include appropriate input and output devices, a computer processor, and a computer program product tangibly embodied in a machine-readable storage device for execution by a programmable processor. A process implementing these techniques may be performed by a programmable processor executing a program of instructions to perform desired functions by operating on input data and generating appropriate output. The techniques may be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing may be supplemented by, or incorporated in, specially designed application-specific integrated circuits (ASICs).

It will be understood that various modifications may be made. For example, other useful implementations could be achieved if steps of the disclosed techniques were performed in a different order and/or if components in the disclosed systems were combined in a different manner and/or replaced or supplemented by other components. Accordingly, other implementations are within the scope of the disclosure.

What is claimed is:

1. A computer-implemented method comprising:
    accessing a first portion of a first interframe difference image a) that represents first motion by a first object that is an object of interest and b) was generated using a first sequence of two or more images captured by a first camera, each first image of which depicts the first object;
    accessing a second interframe difference image i) that represents second motion by a second object that is not an object of interest and b) was generated using a second sequence of two or more images captured by a second camera, each second image of which depicts the second object, the second object being a different object than the first object;
    determining whether a first bounding box for the first object in the first interframe difference image overlaps with a second bounding box for the second object in the second interframe difference image;

generating, using a result of the determination whether the first bounding box for the first object in the first interframe difference image overlaps with the second bounding box for the second object in the second interframe difference image, a third interframe difference image a) that represents both the first motion by the first object that is an object of interest and the second motion by the second object that is not an object of interest and b) by combining the first portion of the first interframe difference image and at least a second portion of the second interframe difference image using values of pixel locations from the first interframe difference image and the second interframe difference image;

training an event detector to detect motion caused by objects of interest by providing, as input to the event detector, the third interframe difference image; and storing, in memory and for a monitoring system of a property, data for the event detector for detecting objects of interest at the property.

2. The method of claim 1, wherein generating the third interface difference image by combining the first portion of the first interframe difference image and at least the second portion of the second interframe difference image comprises:

determining, for one or more first pixel locations in the first interframe difference image and one or more corresponding second pixel locations in the second interframe difference image, an average value of the two pixel locations; and generating the third interframe difference image to include, at one or more third pixel locations each of which correspond to a first location in the one or more first pixel locations and a second location in the one or more second pixel locations, the corresponding average values of the two pixel locations in the first interframe difference image and the second interframe difference image.

3. The method of claim 2, comprising:

determining that the first bounding box for the first object in the first interframe difference image does not overlap with the second bounding box for the second object in the second interframe difference image, wherein:

generating the third interframe difference image is responsive to determining that the first bounding box for the first object in the first interframe difference image does not overlap with the second bounding box for the second object in the second interframe difference image.

4. The method of claim 1, wherein generating the third interface difference image by combining the first portion of the first interframe difference image and at least the second portion of the second interframe difference image using values of pixel locations from the first interframe difference image and the second interframe difference image comprises:

determining, for one or more first pixel locations in the first interframe difference image and one or more corresponding second pixel locations in the second interframe difference image, a weighted average value of the two pixel locations; and generating the third interframe difference image to include, at one or more third pixel locations each of which correspond to a first location in the one or more first pixel locations and a second location in the one or more second pixel locations, the corresponding weighted average values of the two pixel locations in the first interframe difference image and the second interframe difference image.

5. The method of claim 1, wherein generating the third interface difference image by combining the first portion of the first interframe difference image and at least the second portion of the second interframe difference image using values of pixel locations from the first interframe difference image and the second interframe difference image comprises:

generating the third interframe difference image to include a first set of pixel locations with values that are from the first portion of the first interframe difference image that represents motion of the first object that is an object of interest and a second set of pixel locations with values that are from at least the second portion of the second interframe difference image.

6. The method of claim 5, comprising:

determining that a bounding box for the first object that is an object of interest and a bounding box for the second object that is not an object of interest overlap; and in response to determining that the bounding box for the first object and the bounding box for the second object overlap, generating the third interframe difference image to include the first set of pixel locations with the values that are from the first portion of the first interframe difference image that represents motion of the first object that is an object of interest and the second set of pixel locations with values that are from at least the portion of the second interframe difference image.

7. The method of claim 1, wherein generating the third interface difference image by combining the first portion of the first interframe difference image and at least the second portion of the second interframe difference image using values of pixel locations from the first interframe difference image and the second interframe difference image comprises:

determining, for each pixel location within the first portion of the first interframe difference image that represents motion of the first object that is an object of interest, an average value of the pixel location in the first interframe difference image and one or more corresponding second pixel locations in the second interframe difference image; and generating the third interframe difference image to include (i), at one or more third pixel locations each of which are within a bounding box and correspond to a first location in the one or more first pixel locations, the corresponding average values of the pixel locations in the first interframe difference image and the second interframe difference image, and (ii), at one or more pixel locations outside the bounding box, a value from the second interframe difference image.

8. The method of claim 1, wherein generating the third interface difference image by combining the first portion of the first interframe difference image and at least the second portion of the second interframe difference image using values of pixel locations from the first interframe difference image and the second interframe difference image comprises:

generating the third interframe difference image to include a first set of pixel locations with values that are from pixel locations within the first portion of the first interframe difference image that represents motion of the first object that is an object of interest at pixel locations translated from the pixel locations within the portion of the first interframe difference image and a second set of pixel locations with values that are from at least the second portion of the second interframe difference image.

9. The method of claim 8, comprising:
translating the pixel locations within the first portion of the first interframe difference image that represents motion of the first object that is an object of interest to the first set of pixel locations; and
determining that the first set of pixel locations and a bounding box around the second object do not overlap.

10. The method of claim 1, wherein generating the third interface difference image by combining the first portion of the first interframe difference image and at least the second portion of the second interframe difference image using values of pixel locations from the first interframe difference image and the second interframe difference image comprises:
generating the third interframe difference image to include a first set of pixel locations with values that are from pixel locations within the first portion of the first interframe difference image that represents motion of the first object that is an object of interest scaled by a factor and a second set of pixel locations with values that are from the second interframe difference image.

11. The method of claim 1, wherein generating the third interface difference image by combining the first portion of the first interframe difference image and at least the second portion of the second interframe difference image using values of pixel locations from the first interframe difference image and the second interframe difference image comprises:
generating the third interframe difference image to include a first set of pixel locations with values, that are from pixel locations within the first portion of the first interframe difference image that represents motion of the first object that is an object of interest scaled by a factor, at pixel locations translated from the pixel locations within a bounding box and a second set of pixel locations with values that are from at least the second portion of the second interframe difference image.

12. The method of claim 1, wherein accessing a first portion of a first interframe difference image a) that represents first motion by a first object that is an object of interest and b) was generated using a first sequence of two or more images captured by a first camera, each first image of which depicts the first object comprises:
obtaining a first image and a second image from the first sequence of two or more images captured by the first camera;
determining a bounding box around the first object that is an object of interest from the second image; and
generating the first interframe difference image using a difference between values of pixels in the first image and the second image, wherein the first portion of the first interframe difference image that represents motion of the first object that is an object of interest corresponds to a location of the bounding box around the first object that was determined.

13. A system comprising:
one or more computers and one or more non-transitory storage devices storing instructions that are operable, when executed by the one or more computers, to cause the one or more computers to perform operations comprising:
accessing a first portion of a first interframe difference image a) that represents first motion by a first object that is an object of interest and b) was generated using a first sequence of two or more images captured by a first camera, each first image of which depicts the first object;
accessing a second interframe difference image i) that represents second motion by a second object that is not an object of interest and b) was generated using a second sequence of two or more images captured by a second camera, each second image of which depicts the second object, the second object being a different object than the first object;
determining whether a first bounding box for the first object in the first interframe difference image overlaps with a second bounding box for the second object in the second interframe difference image;
generating, using a result of the determination whether the first bounding box for the first object in the first interframe difference image overlaps with the second bounding box for the second object in the second interframe difference image, a third interframe difference image a) that represents both the first motion by the first object that is an object of interest and the second motion by the second object that is not an object of interest and b) by combining the first portion of the first interframe difference image and at least a second portion of the second interframe difference image using values of pixel locations from the first interframe difference image and the second interframe difference image;
training an event detector to detect motion caused by objects of interest by providing, as input to the event detector, the third interframe difference image; and
storing, in memory and for a monitoring system of a property, data for the event detector for detecting objects of interest at the property.

14. The system of claim 13, wherein generating the third interface difference image by combining the first portion of the first interframe difference image and at least the second portion of the second interframe difference image using values of pixel locations from the first interframe difference image and the second interframe difference image comprises:
determining, for one or more first pixel locations in the first interframe difference image and one or more corresponding second pixel locations in the second interframe difference image, an average value of the two pixel locations; and
generating the third interframe difference image to include, at one or more third pixel locations each of which correspond to a first location in the one or more first pixel locations and a second location in the one or more second pixel locations, the corresponding average values of the two pixel locations in the first interframe difference image and the second interframe difference image.

15. The system of claim 14, the operations comprising:
determining that the first bounding box for the first object in the first interframe difference image does not overlap with the second bounding box for the second object in the second interframe difference image, wherein:
generating the third interframe difference image is responsive to determining that the first bounding box for the first object in the first interframe difference image does not overlap with the second bounding box for the second object in the second interframe difference image.

16. The system of claim 13, wherein generating the third interface difference image by combining the first portion of the first interframe difference image and at least the second portion of the second interframe difference image using values of pixel locations from the first interframe difference image and the second interframe difference image:
  determining, for one or more first pixel locations in the first interframe difference image and one or more corresponding second pixel locations in the second interframe difference image, a weighted average value of the two pixel locations; and
  generating the third interframe difference image to include, at one or more third pixel locations each of which correspond to a first location in the one or more first pixel locations and a second location in the one or more second pixel locations, the corresponding weighted average values of the two pixel locations in the first interframe difference image and the second interframe difference image.

17. The system of claim 13, wherein generating the third interface difference image by combining the first portion of the first interframe difference image and at least the second portion of the second interframe difference image using values of pixel locations from the first interframe difference image and the second interframe difference image comprises:
  generating the third interframe difference image to include a first set of pixel locations with values that are from the first portion of the first interframe difference image that represents motion of the first object that is an object of interest and a second set of pixel locations with values that are from at least the second portion of the second interframe difference image.

18. The system of claim 17, the operations comprising:
  determining that a bounding box for the first object that is an object of interest and a bounding box for the second object that is not an object of interest overlap; and
  in response to determining that the bounding box for the first object that is an object of interest and the bounding box for the second object overlap, generating the third interframe difference image to include the first set of pixel locations with the values that are from the first portion of the first interframe difference image that represents motion of the first object that is an object of interest and the second set of pixel locations with values that are from at least the second portion of the second interframe difference image.

19. The system of claim 13, wherein generating the third interface difference image by combining the first portion of the first interframe difference image and at least the second portion of the second interframe difference image using values of pixel locations from the first interframe difference image and the second interframe difference image comprises:
  determining, for each pixel location within the first portion of the first interframe difference image that represents motion of the first object that is an object of interest an average value of the pixel location in the first interframe difference image and one or more corresponding second pixel locations in the second interframe difference image; and
  generating the third interframe difference image to include (i), at one or more third pixel locations each of which within a bounding box and correspond to a first location in the one or more first pixel locations, the corresponding average values of the pixel locations in the first interframe difference image and the second interframe difference image, and (ii), at one or more pixel locations outside the bounding box, a value from the second interframe difference image.

20. A non-transitory computer-readable medium storing software comprising instructions executable by one or more computers which, upon such execution, cause the one or more computers to perform operations comprising:
  accessing a first portion of a first interframe difference image a) that represents first motion by a first object that is an object of interest and b) was generated using a first sequence of two or more images captured by a first camera, each first image of which depicts the first object;
  accessing a second interframe difference image i) that represents second motion by a second object that is not an object of interest and b) was generated using a second sequence of two or more images captured by a second camera, each second image of which depicts the second object, the second object being a different object than the first object;
  determining whether a first bounding box for the first object in the first interframe difference image overlaps with a second bounding box for the second object in the second interframe difference image;
  generating, using a result of the determination whether the first bounding box for the first object in the first interframe difference image overlaps with the second bounding box for the second object in the second interframe difference image, a third interframe difference image a) that represents both the first motion by the first object that is an object of interest and the second motion by the second object that is not an object of interest and b) by combining the first portion of the first interframe difference image and at least a second portion of the second interframe difference image using values of pixel locations from the first interframe difference image and the second interframe difference image;
  training an event detector to detect motion caused by objects of interest by providing, as input to the event detector, the third interframe difference image; and
  storing, in memory and for a monitoring system of a property, data for the event detector for detecting objects of interest at the property.

* * * * *

UNITED STATES PATENT AND TRADEMARK OFFICE
CERTIFICATE OF CORRECTION

PATENT NO. : 12,094,133 B2
APPLICATION NO. : 17/585060
DATED : September 17, 2024
INVENTOR(S) : Narayanan Ramanathan et al.

It is certified that error appears in the above-identified patent and that said Letters Patent is hereby corrected as shown below:

In the Claims

In Claim 1, Column 10, Line 57, delete "i)" and insert -- a) --.

In Claim 13, Column 14, Line 5, delete "i)" and insert -- a) --.

In Claim 20, Column 16, Line 25, delete "i)" and insert -- a) --.

Signed and Sealed this
Fifth Day of November, 2024

Katherine Kelly Vidal
*Director of the United States Patent and Trademark Office*